United States Patent [19]

Ramalingam

[11] Patent Number: 4,851,459
[45] Date of Patent: Jul. 25, 1989

[54] AQUEOUS PEROXY CARBAMYL GROUP CONTAINING POLYMER SYSTEMS AND METHODS OF THEIR PRODUCTION AND USE

[75] Inventor: Balasubramaniam Ramalingam, Columbus, Ohio

[73] Assignee: Century Adhesives Corp., Columbus, Ohio

[21] Appl. No.: 258,460

[22] Filed: Oct. 17, 1988

Related U.S. Application Data

[63] Continuation-in-part of Ser. No. 134,790, Dec. 18, 1987, abandoned.

[51] Int. Cl.$^4$ .................... C08L 75/04; C08K 3/20; C08G 18/30
[52] U.S. Cl. .................... 523/414; 523/416; 424/542; 424/591; 424/726; 424/839; 424/840; 383/93; 156/331.4
[58] Field of Search ............... 524/591, 839, 840, 726, 524/542; 523/414, 416

[56] References Cited

U.S. PATENT DOCUMENTS

| | | | |
|---|---|---|---|
| 4,501,852 | 2/1985 | Markusch | 524/839 |
| 4,528,323 | 7/1985 | Lorenz | 524/839 |
| 4,623,416 | 11/1986 | Henning | 524/839 |
| 4,644,030 | 2/1987 | Loewrigkeit | 524/839 |

OTHER PUBLICATIONS

Saunders et al., *Polyurethanes, Chemistry and Technology, Part I*, pp. 82, 83, 123, 126; Wiley-Interscience; N.Y. 1962.

Esser et al., "Notiz über die Umsetzung von Isocyansaureestern mit Wasserstoffperotyd", Chemische Berichte, vol. 89, No. 3, 1956, pp. 685–688.

Pedersen, "Preparation and Properties of Esters of N-Substitued Peroxycarbamic Acids"; J. Organic Chem., vol. 23, Feb. 1958, pp. 252–261.

Obrien et al., "The Decomposition of Peroxycarbamates and Their Efficiency in Vinyl Polymerization", JACS vol 79:6238 (1957); see also JACS 81:1506 (1959).

*Primary Examiner*—C. Warren Ivy
*Attorney, Agent, or Firm*—Carroll F. Palmer

[57] ABSTRACT

High performance polymer systems based on water dispersed polyurethanes obtained from the reaction of NCO terminated prepolymers with a peroxide compound containing at least one active hydrogen atom, methods of making such polymer systems and their use as hydrolytically stable flexible substrate bonding agents are disclosed. Flexible packages, e.g., retortable laminate pouches, are formed by bonding together sections of films, foils or like flexible substrates using such adhesives.

19 Claims, No Drawings

4,851,459

AQUEOUS PEROXY CARBAMYL GROUP CONTAINING POLYMER SYSTEMS AND METHODS OF THEIR PRODUCTION AND USE

REFERENCE TO RELATED APPLICATION

This application is a continuation-in-part of copending application Ser. No. 134,790, filed Dec. 18, 1987, now abandoned.

BACKGROUND OF THE INVENTION

1. Field of the Invention

This invention broadly relates to polymer systems used in converting processes, methods for their preparation, methods of using them and packages formed therewith. More particularly, it concerns new water borne, peroxy carbamyl group containing polymer systems, methods of forming them from polyurethane materials, and methods of using them, e.g., to make flexible packages from films, foils or like flexible sheet materials, particularly, retortable pouches and like flexible packages.

2. Description of the Prior Art

In the flexible packaging industry, many types of polymer systems are employed, e.g., adhesives, coatings, primers, binders, inks, etc. This invention provides new, improved polymer systems useable as adhesives, coatings, primers, binders, inks or the like in converting or other processes.

A number of adhesive systems that are solvent-based and a select few water-based systems are being used in the production of laminates and other materials used in the packaging of food, non-food and medical products. While solvent-based adhesives have dominated this market for a number of years due to economical and ecological reasons, there is a growing need for competitive, high performance water borne adhesive systems.

Although a number of water-based adhesive systems claim to fulfill the various needs of the packaging industry, they all exhibit various disadvantages. This is due to the fact that the lamination process used in making packaging laminates, so-called converting, is complicated and involves many requirements for any acceptable adhesive system. Thus, useable adhesive systems should be machinable, compatible with a wide variety of printing inks, fast drying at very high coating speeds and devoid of foam or other undesirable problems. Further, the adhesive systems should be capable of bonding a host of different type films, paper products and foil to one another, yet provide very good initial and final bonding of such materials to give clear laminated end products. Depending on the product that packages made for such laminates are to hold, a number of other requirements must be addressed, e.g., retortable packages (see below) used for food or medical products should be able to withstand high retort temperatures and/or pressures.

A wide range of monolayer materials and multilayer structures are used in the flexible packaging industry for the containment of food, medical and other products. To meet the required compatibility of the packaging materials to the contents of the resulting packages, a variety of different flexible materials are used, e.g., papers, films, foils, metalized films and metalized papers. For the sake of brevity, all such materials will be referred to herein as flexiblele substrates. Also, the term flexible packages as used herein encompasses packages made entirely of flexible materials, e.g., pouches, as well as semirigid containers that lave at least one flexible body wall or lid.

One important class of flexible packages extensively used to contain food and medicinals are called retortable packages, i.e., packages capable of withstanding thermal processing in a pressure autoclave at temperatures in excess of 100° C. (see "Retortable Flexible and Semirigid Packages", pps. 568–571, Willey Encyclopedia of Packaging Technology by Marilyn Bakker).

Retortable packages must maintain their material integrity as well as their required barrier properties during product-to-package handling, thermal processing and subsequent shipping and handling. In the case of shelf stable food packages, the flexible substrate used must be retortable and still maintain extended barrier characteristics. In making such retortable packages, flexible substrates have been sealed together by adhesives that are solvent-based systems. The processing of such adhesives takes a number of days, e.g., up to 13, to complete. In addition to this drawback, the solvent system adhesives present environmental and economic problems so that is an ever growing need for aqueous system adhesives capable of replacing solvent system adhesives. This invention helps to fulfill this need with new forms of polyurethane aqueous dispersions.

Aqueous polyurethane systems that are ionomeric in nature are a known class of product, see U.S. Pat. Nos. 4,598,121; 4,540,633 and 4,240,942, Canadian Pat. No. 837,176, German Pat. No. AS2624442 and references cited therein, the disclosures of which are incorporated herein by reference for their teachings concerning formation of polyurethane prepolymers that are converted into an ionomer containing free NCO groups which are then reacted with a diol or other difunctional reagent to give chain extended polymers. This invention uses this known prior art with a new combination of reagents to produce new forms of polyurethane aqueous dispersions that have been discovered to possess unique adhesive properties.

OBJECTS

A principal object of the invention is the provision of new aqueous polymer systems that can be used as the base for a variety of products used in converting operations, including adhesives, coatings, primers, binders and inks.

Further objects include the provision of:

1. Such aqueous polymer systems that are highly efficient for use with a variety of films, foils and paper products.

2. Water borne adhesive systems that can form adhesive bonds capable of withstanding severe conditions of temperature and pressure, e.g., package retorting conditions.

3. Aqueous adhesives that require much shorter processing time than known solvent system adhesives currently in use.

4. Aqueous system polyurethane adhesives that exhibit excellent adhesion in a variety of film/film and film/foil, etc. lamination applications, particularly retortable laminates.

5. New methods for the production of aqueous system adhesives.

6. New forms of retortable and other flexible packages.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new aqueous polymer systems comprising an aqueous dispersion of a reaction product of an NCO terminated prepolymer with a peroxide compound containing at least one active hydrogen atom, e.g., hydrogen peroxide.

Preferred polymer systems of the invention have a solids content of between about 20 to 50% of the total dispersion or a solids content of between about 25 to 65% containing about 5 to 15% epoxy resin or other suitable resin or resins that can react with pendant carboxyl groups or other groups of the polyurethane.

In the foregoing paragraph, the percentages given are by weight and are the percentage of the specified component based on the weight of the total dispersion. This statement is also to apply throughout this specification and claims unless otherwise specified.

The water dispersable prepolymers used in accordance with the invention are obtained by methods disclosed in the aforementioned prior art references by reaction of polyisocyanates with polyols in a mole ratio as close to one as possible such that the average molecular weight of the final system is as high as possible.

The objects are further accomplished by the provision of new flexible packages, particularly retortable packages, comprising a joint between a plurality of sections of flexible substrate bonded together by an layer of adhesive comprising a polyurethane polymer obtained by reaction of NCO groups in a prepolymer with a peroxide compound containing at least one active hydrogen atom.

Additionally, the invention provides new methods of forming flexible packages which comprises (a) providing an aqueous system adhesive comprising an aqueous dispersion of a polyurethane obtained by reaction of NCO groups of a prepolymer with a peroxide compound containing at least one active hydrogen atom (b) providing at least one flexible substrate, (c) applying a layer of the adhesive to at least one selected section of the substrate and (d) forming at least one joint between the selected section of the substrate and another section of the same or different substrate by sandwiching the adhesive layer therebetween.

Further, it provides new methods of producing an aqueous system adhesive for bonding together flexible substrates which comprises (1) preparing a prepolymer containing free NCO groups by reacting an aromatic, aliphatic or cycloaliphatic diisocyanate with a polyol and an ionic group containing organic compound, (2) forming an ionomer by reacting the resulting prepolymer with a tertiary amine and (3) forming an aqueous dispersion of polyurethane by reacting the ionomer in the presence of water with one or more peroxide compounds containing at least one active hydrogen. The quantity of peroxide compound reacted with the ionomer is preferably in excess of the stoichiometric requirement for total reaction with the free NCO groups in the ionomer.

In preferred methods of the invention, the anionic group containing compound is dimethylol propionic acid and the tertiary amine is triethylamine added in sufficient amount to neutralize the anionic groups contained in the prepolymer. Also, in some embodiments, the prepolymer may be prepared in the presence of an inert organic solvent in the amount of about 1 to 10% by weight based on the combined weight of the solvent and the prepolymer forming reagents.

In the polyurethane dispersion production methods of the prior art cited above, the reaction of an amine $R^1NH_2$ with an isocyanate RNCO, the resulting compound contains a urea linkage:

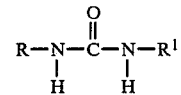

or if the reaction is with a diamine $H_2N—R^1—NH_2$, two urea linkages (diurea):

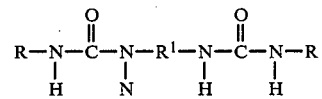

However, when the reaction of the isocyanate is with a peroxide containing at least one active hydrogen atom, e.g., $R^2OOH$ where $R^2$ is preferably C1–C10 alkyl, cycloalkyl or aryl, in accordance with the invention, a peroxy carbamyl group compound is formed:

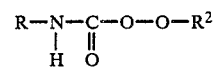

In the case of hydrogen peroxide, which has two active hydrogen atoms, peroxy dicarbamyl group compounds containing O,O-dicarbamyl peroxide linkages are formed:

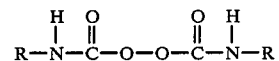

It has been discovered as a result of this invention that these peroxy carbamyl groups in aqueous polyurethane dispersions bestow some unusual adhesive properties on the dispersions. Thus, such dispersions exhibit critically improved bonding to most film and foil combinations used in the flexible packaging industry. Further, the resulting bonds are retained even under harsh testing environments used in retortable applications.

DESCRIPTION OF THE PREFERRED EMBODIMENTS

To produce an aqueous system adhesive of the invention, first a prepolymer based on a di/poly isocyanate, di/polyol and an ionic group containing organic compound, particularly an ionic diol, is prepared using reactant proportions so that the resulting prepolymer contains free NCO groups. The di/polyfunctional isocyanate used is selected from the class of aromatic, aliphatic or cycloaliphatic diisocyanates, preferably those containing 6 to 15 carbon atoms. Examples of commercially available useable isocyanates include "Desmodur-W" (4,4'-methylene bisdicyclohexyl diisocyanate) and isophorene diisocyanate. Adducts of the class isocyanates with di/polyols described below and oligomers of the class isocyanates can also be used.

The di/polyols used in the invention are selected from dihydroxy compounds of molecular weight between about 2000 and 3000. Such diols can be condensation products of commercially available dicarboxylic acids and diols. Also, polyether diols based on ethylene or propylene oxide can be used. Commercially available diols of this class include the "Formerez" series and "ED" series of polyols marketed by Witco Chemical Co.

The ionic group containing compounds used are carboxylic or sulfonic acids containing up to 10 carbon atoms and two hydroxyl groups. A preferred compound is dimethylolpropanoic acid. Other useable compounds include 1,3 diamino-2-propanoic acid, and 1,3 diamino alkylene sulfonic acids. The prior art patents referenced above contain numerous examples of polyisocyanates, polyols and methods of reacting them with water dispersable groups.

Alternatively, polyols carrying pendant carboxyl groups can be used, U.S. Pat. No. 4,460,738 discloses methods of making such polyols and such disclosure is incorporated herein by reference. Since these polyols have groups that can be converted into an ionic group, a separate reaction with a compound such as dimethylol propanoic acid is not necessary. Also, mixtures of polyols with pendant groups that are ionizable and polyols that do not have such groups may be used.

A catalyst, e.g., dibutyltin dilaurate, is advantageously used in forming the prepolymer. Also, small amounts, e.g., 1 to 10% by weight, of inert solvent may be used if viscosity of the prepolymer presents processing problems, e.g., problems is disbursing the prepolymer in water. Examples of useable solvents include N-methyl pyrrolidone, commercially available as "M-Pyrole" from BASF, 1,4-dioxane, DMF and ethylene glycol dimethylether. Also useable are monomers or polymers that do not participate in the reaction under the prevailing conditions. Examples of such materials acting as inert solvents are alkyl acrylate, alkyl methacrylates, vinyl group containing monomers and/or polymers.

The prepolymer is then converted into an ionomer by reaction with a tertiary amine, typically a trialkylamine, e.g., triethylamine. Following this, the ionomer is slowly added with agitation to a water solution of peroxide compound containing at least one active hydrogen atom to produce the final polyurethane aqueous dispersion.

Hydrogen peroxide is a preferred peroxide compound for use in producing the new polymer systems of the invention. Other useable peroxide reagents containing one or more active hydrogen atoms include t-butyl hydroperoxide, cumene hydroperoxide, tetralin hydroperoxide and similar alkyl, cycloalkyl and aryl mono or poly hydroperoxides. Mixtures of one or more peroxide compounds may be used. Also, instead of using such reagents per se, materials that give rise to such peroxides in an aqueous system may be used. For example, instead of using hydrogen peroxide pre se, alkali metal peroxides, e.g., NaOONa, KOOK, alkaline earth metal peroxides or the like may be used as the peroxide reagent precursor.

The prepared dispersion per se may be used as a polymer system in accordance with the invention or it may be compounded with up to 15% by weight, preferably 5 to 15%, of commercially available melamine resins, e.g., "Cymel 301" from American Cyanamid, or epoxy resin, e.g., "Epon 828" from Shell Chemical Co. The dispersions may also be compounded with up to 15% by weight of vinyl-type compounds, e.g., vinyl acetate, methyl acrylate, styrene, etc., and vinyl group containing polymers.

Typically, the new polymer systems of the invention, when used as adhesives, are applied, e.g, by use of a drawdown bar, to a film, foil or. other flexible substrate to give a coating weight of about 1 to 2 pounds, especially 1–1.5#, per 3000 square yards of substrate surface. The coated substrate is dried to remove substantially all the water. The tacky surface is then bonded to a second same or different substrate by application of pressure to give good contact.

EXAMPLE 1

Into a three neck flask provided with a thermometer, mechanical stirrer and drying tubes, was placed 63 grams of "Desmodur-W" diisocyanate (Mobay) 197 g of "ED-3000" diol (WitcO), a drop of dibutyltin dilaurate. Then, 20 ml of "M-pyrole" solvent were added. The contents were heated to 80° C. for an hour and 17.2 g of dimethylol propionic acid were added plus another drop of DBTDL, after which the heating was continued for 5.5 hours. At the end of this reaction period, 12.9 g of triethylamine were added and stirring was continued for 15 minutes to form the ionomer.

The resulting ionomer was slowly added over a period of 15 minutes to a vigorously stirred solution of 5.4 g of 30% hydrogen peroxide dissolved in 500 ml of water. The stirring was continued for an hour to complete the formation of the polyurethane dispersion which was stored for 24 hours before being tested for adhesive Properties. The resulting dispersion contained about 32% solids and had a pH of about 7.4.

EXAMPLE 2

The procedure of Example 1 was repeated except that "Formerez 55-56", a 2000 molecular weight polyester diol, was used in the place of "ED-2000".

The dispersions of Examples 1 and 2 were mixed with 15% by weight of epoxy resin ("Epon 828") containing a small amount of surfactant and coated on a variety of substrates by means of a drawbar to give a coating weight of 1–1.5#/3000 sq.yd. The coated substrates were air dried using a hair dryer to remove all water. The resulting tacky surface of each specimen was then bonded to a second film or foil and hand-pressed using a 4.5# roller to give good contact. Then, the resulting laminates were heated in a commercial, temperature controlled hot plate device; ("Sentinel" marketed by Packaging Industries Group Inc.) for 0.5 sec. at 180 F at 100 psi. Finally, bond strengths were measured at the initial time, after 24 hrs. and after 3 days in an oven at 130 F. Also, the laminates kept for 3 days were heated in an autoclave at 260 F. for 20 minutes at 23 psi. to simulate a retortable environment and then dried.

Bond strengths were measured using ASTM (American Standard Testing Methods) D1876 method for adhesion peel values. The resulting test data are reported in Table I.

EXAMPLE 3

Example 1 was repeated, except instead of hydrogen peroxide, 12.8 g of 70% t-butyl hydroperoxide was used.

TABLE I

| Exp. | Laminates I | II | Initial | 72 Hrs. 130° F. | After Retort |
|---|---|---|---|---|---|
| 1 | Polyester | Foil | 300 | D* | D* |
|   | Foil | PP* | 350 | D | D |
| 2 | Polyester | Foil | 300 | D | D |
|   | Foil | PP | 37S | D | D |

D* = destruct bond
PP* = polypropylene.

Further, destruct bonds (one or both of the substrates destruct before the adhesive fails) have been obtained in 3 days when stored at 130° F. The same results have also been obtained for a 10-day storage at room temperature. With the SOlvent based adhesives that are used for retort applications, the lamination of polyester/foil takes 3 days when stored at 130° F., while foil/polypropylene lamination. Storage of 10 days at 130° F.

The data of Table I shows that when hydrogen peroxide is used in accordance with the invention, the laminates withstand the retortability test destructed before the adhesive fails, have been obtained in 3 days when stored at 130° F. The same result has also been obtained with 10 day storage at room temperature. With solvent system adhesives that are used for retort applications, the laminates of polyester/foil takes 3 days when stored at 130° C., but the foil/pp laminations require storage of 10 days at 130° F. Thus, the aqueous system adhesives of the invention save much time in required bond formation, avoid use of costly solvents and the use of unreacted "free isocyanates" that is the key component of the solvent system adhesives. Another major feature of the new adhesives is their ability to form required bond strength to withstand retorting by simply being stored for 10 days at room temperature. This is particularly useful in connection with film that cannot withstand 130° F. heating, e.g., polyethylene films used in snack packaging. Typical bond strengths obtained with 10 days storage at room temperature with a number of films to polyethylene film laminations when the adhesive was the Example 1 disperson to which was added 15% "Epon 828" epoxy resin (Shell Chemical Co.) are reported in Table II.

TABLE II

|  | Initial | 20 Hrs. | 72 Hrs. | 1 Week |
|---|---|---|---|---|
| PE/Polyethylene | 250 | 500 | 950 | D |
| PE/polypropylene | 200 | 525 | 675 | D |
| PE/polyester | 275 | 450 | D | D |
| PE/nylon | 300 | 500 | 650 | D |
| PE/metal foil | 325 | 500 | 625 | D |

PE = Polyethylene.

Table III shows bond strength obtained using the product of Example 3 as the adhesive system.

TABLE III

|  | Initial | 24 Hrs. | 72 Hrs. | 1 Week |
|---|---|---|---|---|
| Polypropylene/Polypropylene | 250 | 400 | 600 | D |
| Polyester/Foil | 250 | 300 | 350 | D |

The embodiments of the invention in which an exclusive property or privilege is claimed are defined as follows:

1. An aqueous polymer system comprising an aqueous dispersion of a polyurethane containing peroxy carbamyl groups.

2. An aqueous adhesive system for bonding together flexible substrates comprising the polymer system of claim 1.

3. An aqueous adhesive system for bonding together flexible substrates comprising an aqueous dispersion of a polyurethane containing O,O-dicarbamyl peroxide linkages.

4. An aqueous polymer system comprising an aqueous dispersion of a polyurethane reaction product of an NCO terminated prepolymer and a peroxide containing at least one active hydrogen atom.

5. A polymer system of claim 4 wherein said peroxide is hydrogen peroxide and said reaction product contains O,O-dicarbamyl peroxide linkages.

6. A method of producing an aqueous system adhesive for bonding together flexible substrates which comprises:
   preparing a prepolymer containing free NCO groups by reacting a 6 to 15 carbon atom aromatic, aliphatic or cycloalphatic diisocyanate with a diol of molecular weight between about 2000 to 3000 and an anionic group containing organic compound,
   forming an ionomer by reacting the resulting prepolymer with a tertiary amine, and
   forming an aqueous dispersion of peroxy carbamyl group containing polyurethane by reacting said ionomer in the presence of water with a peroxide compound containing at least one active hydrogen atom.

7. The method of claim 6 wherein said peroxide compound is hydrogen peroxide and said peroxy carbamyl groups are O,O-dicarbamyl peroxide linkages.

8. The method of claim 7 wherein the quantity of hydrogen peroxide reacted with said ionomer is in excess of the stoichiometric requirement for total reaction with the free NCO groups in said ionomer.

9. The method of claim 8 wherein said ionic group containing compound is dimethylol propionic acid and said tertiary amine is triethylamine added in sufficient amount to neutralize the ionic groups contained in said prepolymer.

10. The method of claim 8 wherein said prepolymer is prepared in the presence of an inert organic solvent or diluent in the amount of about 1 to 10% by weight based on the combined weight of said solvent and said prepolymer forming reagents.

11. The method of claim 10 wherein said solvent is N-methylpyrrolidone.

12. An aqueous system adhesive prepared by the method of claim 8 having a solids content of between about 20 to 50%.

13. An aqueous system adhesive having a solids content of between about 25 to 75% containing about 5 to 25% melamine resin, epoxy resin or vinyl resin added to an aqueous dispersion of peroxy carbamyl group containing polyurethane prepared by the method of claim 8.

14. An aqueous system adhesive for bonding together flexible, non-porous film or foil comprising an aqueous dispersion of about 20 to 50% by weight of the reaction product of (1) a prepolymer containing free NCO groups formed by reacting a 6 to 15 carbon atoms aliphatic or cycloalphatic diisocyanate with a diol of molecular weight between about 2000 to 3000 and an ionic group containing organic compound and (2) one or more peroxide compounds containing at least one active hydrogen atom.

15. The adhesive of claim 14 wherein said peroxide compound is hydrogen peroxide.

16. The adhesive of claim 14 wherein said peroxide compound is an organic hydroperoxide.

17. The adhesive of claim 14 wherein said peroxide compound is an alkyl hydroperoxide.

18. The adhesive of claim 14 wherein said peroxide compound is supplied by a precursor capable of forming a peroxide compound containing at least one active hydrogen atom in the reaction system.

19. The adhesive of claim 14 wherein said peroxide compound is a mixture of peroxide compounds containing at least one active hydrogen atom.

* * * * *